US012637996B1

(12) United States Patent
Hadjerioua et al.

(10) Patent No.: US 12,637,996 B1
(45) Date of Patent: May 26, 2026

(54) HYDROPOWER TURBINE

(71) Applicant: Mesa Associates, Inc., Madison, AL (US)

(72) Inventors: Boualem Hadjerioua, Knoxville, TN (US); Kevin Polak, Southington, CT (US); Thomas V. Eldredge, Southport, NC (US)

(73) Assignee: MESA ASSOCIATES, INC., Madison, AL (US)

( * ) Notice: Subject to any disclaimer, the term of this patent is extended or adjusted under 35 U.S.C. 154(b) by 0 days.

(21) Appl. No.: 19/368,794

(22) Filed: Oct. 24, 2025

(51) Int. Cl.
*F03B 3/06* (2006.01)

(52) U.S. Cl.
CPC ........ *F03B 3/06* (2013.01); *F05B 2240/3052* (2020.08); *F05B 2260/4021* (2013.01)

(58) Field of Classification Search
CPC ................ F03B 3/06; F05B 2240/3052; F05B 2260/4021
See application file for complete search history.

(56) References Cited

U.S. PATENT DOCUMENTS 6,267,551 B1 * 7/2001 Dentinger ............... F03B 3/126 415/214.1

* cited by examiner

*Primary Examiner* — Tulsidas C Patel
*Assistant Examiner* — Joseph Ortega
(74) *Attorney, Agent, or Firm* — Brian T. Sattizahn; Maynard Nexsen PC

(57) ABSTRACT

A hydropower generation system includes a hydropower turbine with both adjustable wicket gates and adjustable runner blades. The hydropower turbine can receive water flow with a head of up to 110 feet. The runner hub of the hydropower turbine can have 8 runner blades that can rotate at a speed of at least 700 revolutions per minute to produce about 500 kW of power from the corresponding generator of the hydropower generation system. In addition, the hydropower turbine can be coupled to the generator with a belt drive that transfers the torque from the hydropower turbine to the generator.

20 Claims, 14 Drawing Sheets

HYDROPOWER TURBINE

BACKGROUND

The present application generally relates to a hydropower turbine. More specifically, the present application is directed to a "high head" Kaplan turbine for a hydropower generation system.

Hydropower generation (or hydroelectric power generation) typically uses water flowing through a turbine to produce electricity. There are many different types of turbines that can be used for hydropower generation. The two main categories of turbines used for hydropower generation are reaction turbines and impulse turbines. Reaction turbines may be used for hydropower generation at sites having lower head and higher flow, while impulse turbines can be used for hydropower generation at sites having higher head and lower flow.

One common type of reaction turbine used for hydropower generation is a propeller turbine. Conventional propeller turbines typically have fixed runner blades. However, a Kaplan turbine typically incorporates both adjustable runner blades and adjustable wicket gates to enable a wide range of operation. Some Kaplan turbines can provide high efficiency power generation but are limited in the actual amount of generated power (e.g., 75-250 kW) due to an inability to accommodate heads larger than about 42.7 feet (or 13 meters). In addition, a typical "low-head" Kaplan turbine incorporates a runner with 3-6 runner blades. Runners typically rotate at speeds of about 300-400 revolutions per minute (rpm) for these lower head turbines and generally operate at higher torque with the lower operational speeds.

Therefore, what is needed is a hydropower turbine that can operate with the efficiency of a typical Kaplan turbine but accommodate larger heads to generate more power.

SUMMARY

The present application generally pertains to a hydropower turbine used in a hydropower generation system that can operate efficiently up to a hydraulic head of 110 feet expanding the head range of existing Kaplan turbines. The hydropower turbine includes a casing having an inlet to receive water and smaller outlet to discharge water from the turbine. The turbine also includes a runner assembly that is positioned inside the turbine case or casing and extends between the inlet and the outlet. The runner assembly includes a runner hub positioned near the outlet, a plurality of adjustable runner blades mounted on the runner hub, and a spindle shaft extending from the runner hub. In one embodiment, the plurality of adjustable runner blades can be 8 runner blades. The hydropower turbine also includes a bulb assembly connected to the runner assembly. The bulb assembly includes a housing to enclose at least a portion of the spindle shaft and a pulley mounted on the spindle shaft to receive a belt to couple the turbine to a generator. The hydropower turbine further includes a plurality of adjustable wicket gates positioned inside the turbine case to direct water flow to the plurality of runner blades. The plurality of runner blades of the runner assembly rotate at a speed of 700 revolutions per minute upon water flowing over the runner blades from a head of 45-110 feet.

The hydropower turbine of the present application can be operated on or off of a power grid; can be modular in design, thereby permitting multiple units to be operated in series; can have the ability to alternate between operation as the primary turbine and one turbine in a series of turbines; and can implement techniques for automatic regulation and synchronization when using multiple units. In addition, the hydropower turbine can incorporate an integrated self-contained computer-based control system. The closed loop control system can modulate both wicket gate and runner blade positions based on the actual power output from the generator, inputs from various turbine sensors, and external data such as pool level and flow measurements, which may be used but is not required. The control system can implement continuous searching capabilities for optimized power output starting with an initial wicket gate-to-runner blade position relationship. The control system then utilizes a search-and-fine-tune algorithm to optimize peak operational efficiency based on runner blade angle and actual power output independent of wicket blade angle.

An advantage of the present application is that the small size and modularity of the hydropower turbine allows for ease of deployment, installation and maintenance.

Another advantage of the present application is that the hydropower turbine can operate at higher heads and lower flows than typical Kaplan turbines.

A further advantage of the present application is that, when used with a controller with optimization, the hydropower turbine can provide an increased power output from the hydropower generation system without using excess water.

Yet another advantage of the present application is that the transfer of torque from the hydropower turbine to the generator is accomplished through the use of a belt drive instead of an oil filled gear box. This eliminates the need for hydraulic or lubrication oil reservoirs located in close proximity to the water source minimizing environmental impact, reduces noise levels, and allows for simplified maintenance.

Other features and advantages of the present application will be apparent from the following more detailed description of the identified embodiments, taken in conjunction with the accompanying drawings which show, byway of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
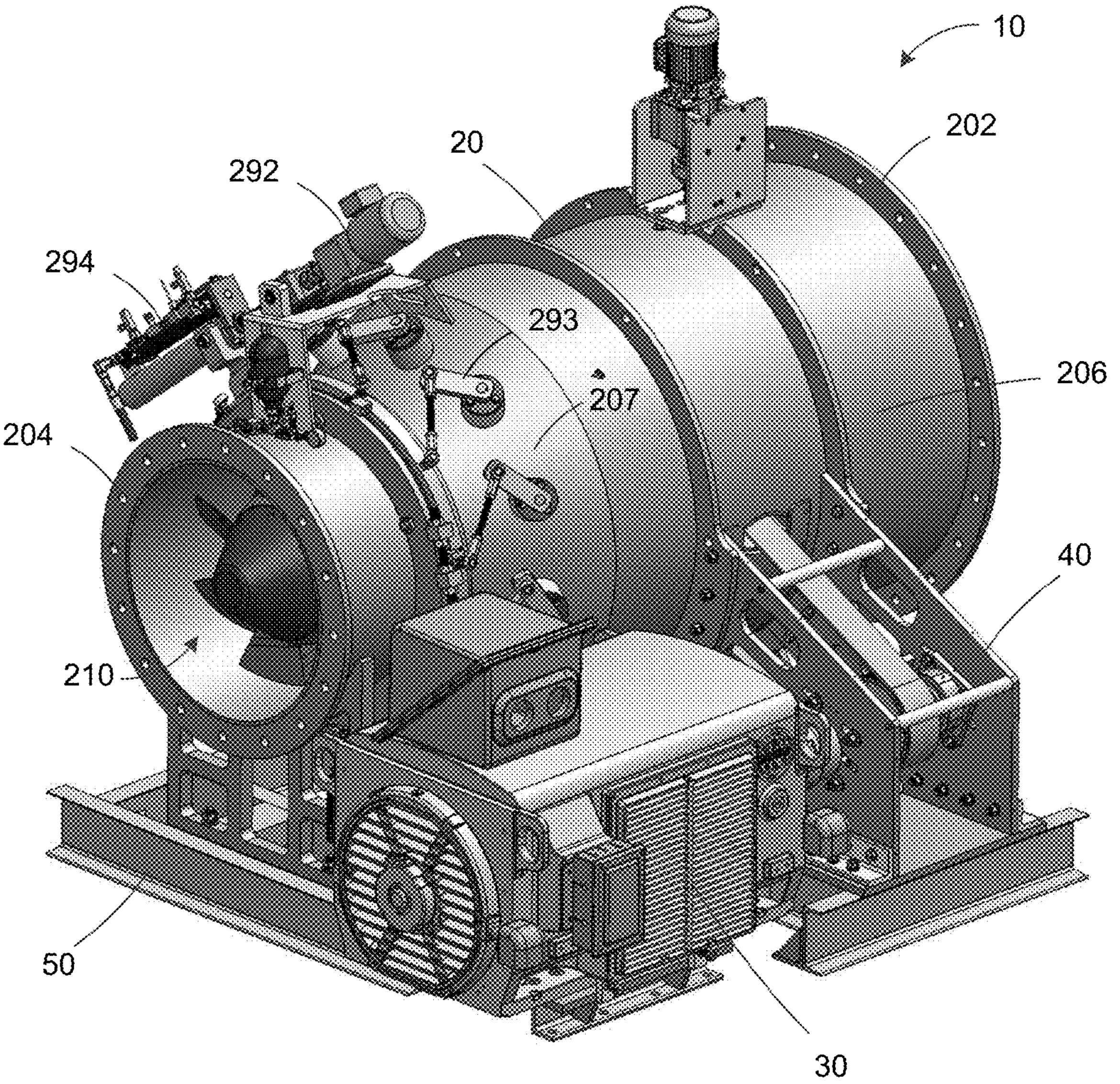
FIG. 1 is a rear perspective view of an embodiment of a hydropower generation system.
Figure 2:
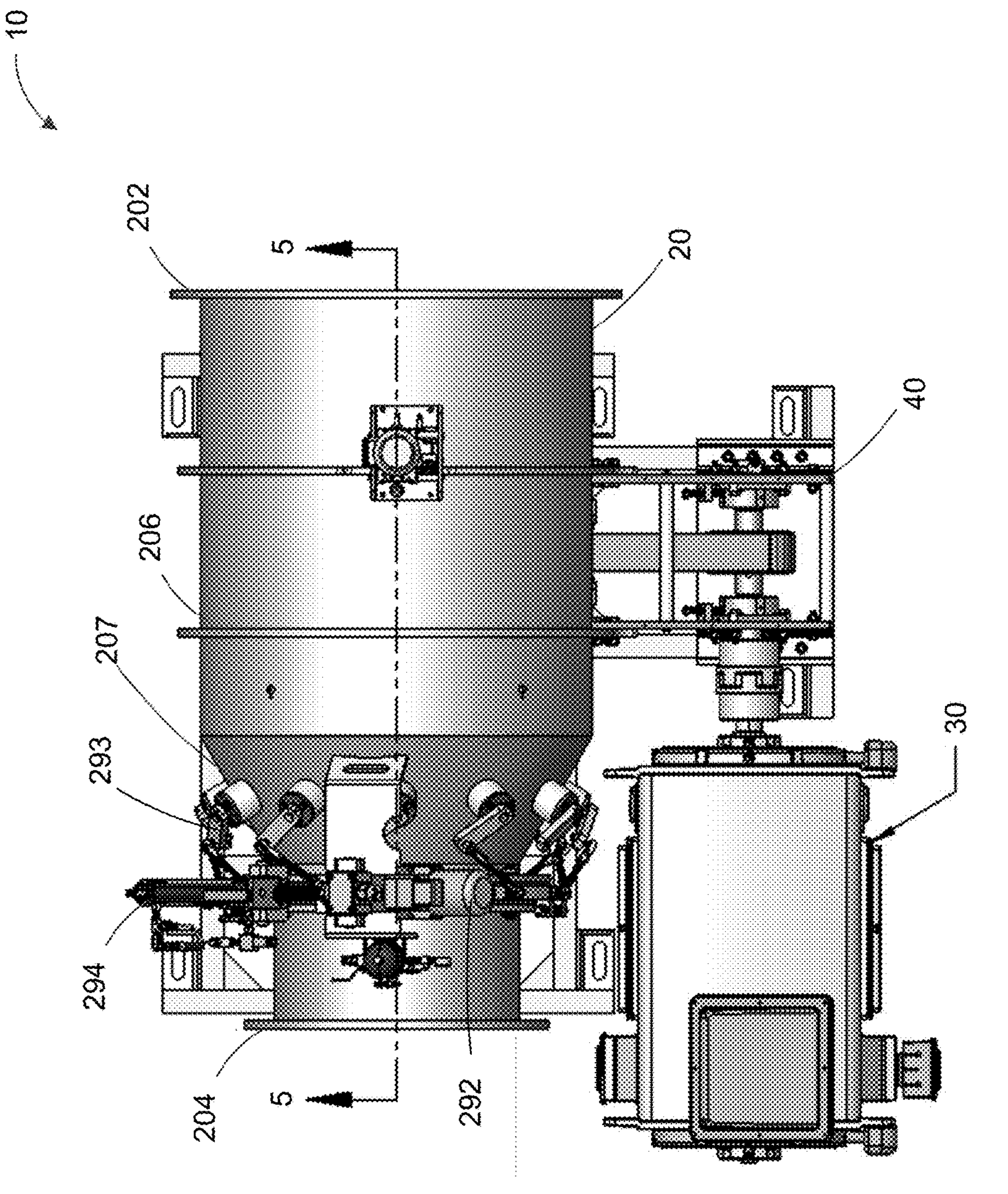
FIG. 2 is a top view of the hydropower generation system of FIG. 1.
Figure 3:
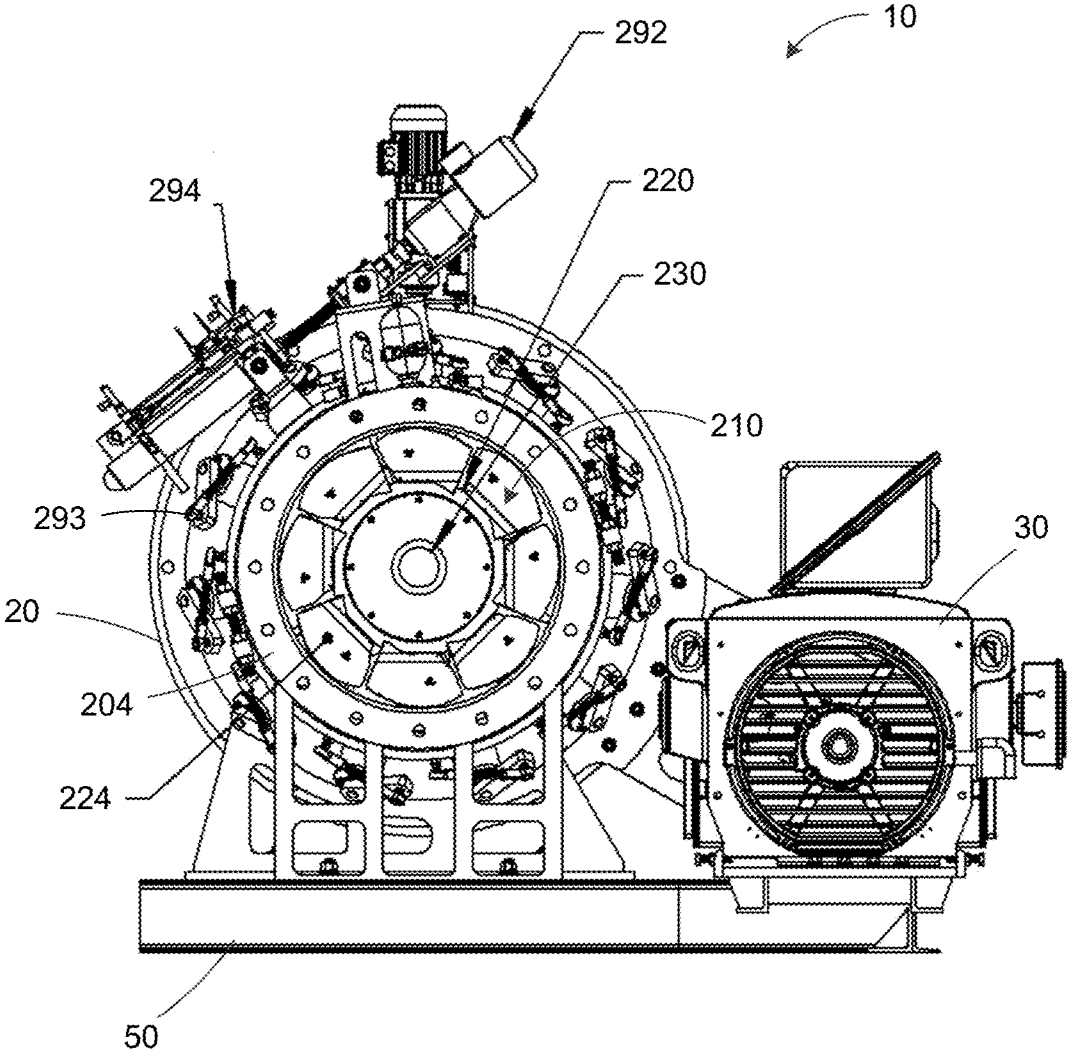
FIG. 3 is a rear view of the hydropower generation system of FIG. 1.

FIGS. 1-4 show an embodiment of a hydropower generation system. The hydropower generation system 10 includes a hydropower turbine 20 and a generator 30 coupled together by a transfer assembly 40. In one embodiment, the turbine 20 and the transfer assembly 40 can be connected to a mounting frame (or skid) 50 to form a single unit and the generator 30 can be mounted separately from the mounting frame 50 (i.e., not connected to the mounting frame 50). However, in other embodiments, the generator 30 may also be connected to the mounting frame 50 and be included as part of the single unit. The turbine 20 can be a "high head" Kaplan turbine that can operate with a head from 45 feet (13.7 meters) up to 110 feet (33.5 meters) and a flow from 30 cubic feet per second (cfs) (0.85 cubic meters per second (cms)) up to 90 cfs (2.5 cms). In one embodiment, the generator 30 can use a 480 VAC (alternating current (AC) voltage), 60 Hz (Hertz), 3 Ph. (phase) induction motor operating at 1200 RPM (revolutions per minute) that can produce up to 500 kW (kilowatts) of power. However, in other embodiments, the generator 30 can use different voltage motors (e.g., 230 VAC or 460 VAC) operating at different frequencies (e.g., 50 Hz). The transfer assembly 40 can use a belt drive to couple the turbine 20 and the generator 30 in order to transfer torque from the turbine 20 to the generator 30. The belt of the belt drive can be a carbon reinforced polyurethane material. However, in other embodiments, any suitable material for the belt may be used.

The turbine 20 has an inlet 202 that can receive water into the turbine 20 and an outlet 204 to discharge water from the turbine 20. Both the inlet 202 and outlet 204 can be connected to corresponding piping (not shown) using any suitable technique. In one embodiment, the inlet 202 can be a pipe having a first inner (or hydraulic) diameter and the outlet 204 can be a pipe having a second inner (or hydraulic) diameter that is smaller than the first inner diameter (e.g., about 55-65% of the first diameter). A turbine case assembly or casing 206 spans between the inlet 202 and the outlet 204 and can incorporate the inlet pipe 202, the outlet pipe 204 and a tapered transition pipe 207 that connects the inlet pipe 202 and the outlet pipe 204.

A runner or runner assembly 210 is positioned inside the turbine case assembly 206 between the inlet 202 and the outlet 204. As further shown in FIGS. 5-8, the runner assembly 210 can include a runner hub 220 with runner blades 224 extending circumferentially from the runner hub 220. The runner blades 224 can be mounted in the runner hub 220 with corresponding runner bearings and seals 222 that permit rotation of the runner blades 224 relative to the runner hub 200. To adjust the pitch of the runner blades 224, a control system commands a servomotor to activate rotating the pitch adjustment shaft engaging the runner control gearbox and a push-pull rod 232 changing the position of the runner blades 224. In one embodiment, the runner assembly 210 (i.e., the runner hub 220 and runner blades 224) can have a diameter that is just smaller than the second inner diameter. The runner assembly 210 can also include a spindle shaft 226 in a spindle housing 228 connected to the runner hub 220. In one embodiment, the runner hub 220 can have a diameter that is about 60-65% of the diameter for the runner assembly 210. The runner hub 220 can be located adjacent to the outlet 204 and can have a nose cone 230 extending from the runner hub 220 towards the opening of the outlet 204. Extending from the runner hub 220 towards the inlet 202 is a rod 232 that passes through the spindle shaft 226 and spindle housing 228. In one embodiment, the center of the rod 232 corresponds to an axis of rotation for the runner hub 220 and can be located a preselected distance from the bottom of the mounting frame 50, where the preselected distance is based on the first inner diameter and the height of the mounting frame 50.

To facilitate rotation of the spindle shaft 226 in the spindle housing 228, an outlet bearing 234 can be located in the spindle housing 228 towards the outlet 204 and an inlet bearing 236 can located in the spindle housing 228 towards the inlet 202. The spindle shaft 226 can be sealed at the "outlet" end of the spindle housing 228 with a mechanical seal 240, an outlet bearing shaft seal 242 and a wet seal cover 244. The inlet bearing 236 can be sealed and retained in place with an inlet bearing shaft seal 246 and a bearing retainer 248. A retaining nut 249 can be connected to the end of the spindle housing 228 to connect the runner assembly 210 to a bulb assembly 280.

The bulb assembly 280 can include a housing 282 that is mounted in the turbine case assembly 206 using one or more supports 284 and an inlet cover 286 connected to the housing 282 adjacent to the inlet 202. The supports 284 can also provide a path for wiring and grease lines from the bulb assembly 280 to the external of the turbine case assembly 206. The inlet cover 286 can have a bulb shape to assist with the diversion of the incoming water around the housing 282. In one embodiment, the inlet cover 286 can have an outer diameter that matches the diameter of the housing 282 and is less than 50% of the first inner diameter. At the other end of the housing 282 opposite the inlet cover 286, the housing 282 can have a tapered portion 288 with wickets (or wicket gates) 290 located circumferentially around the tapered portion 288. The wickets 288 are mounted on individual shafts that extend through each wicket 288 and have one end in the turbine case assembly 206 and the other end in the tapered portion 288 of housing 282. In one embodiment, 11 wickets 290 can be positioned around the tapered portion 288, but more than 11 wickets 290 or fewer than 11 wickets 290 can be used in other embodiments.

Located inside the housing 282 is a drive assembly with a spindle pulley 250 connected to the spindle shaft 226 at the end of the spindle housing 228 opposite the runner hub 220. A control gearbox 252 can be connected to the rod 232 next to the spindle pulley 250 and a thrust bearing 254 can be connected to the end of the rod 232. A torque limiter 256 can be connected to the control gearbox 252 to control the position of the runner blades 224 of the runner assembly 210 in response to control instructions from a control system. In an embodiment, the runner control gearbox 252 includes right-angled gearing to permit the torque limiter 256 to mount on the external surface of the turbine case assembly 206 perpendicular to the spindle shaft 226.

Figure 4:
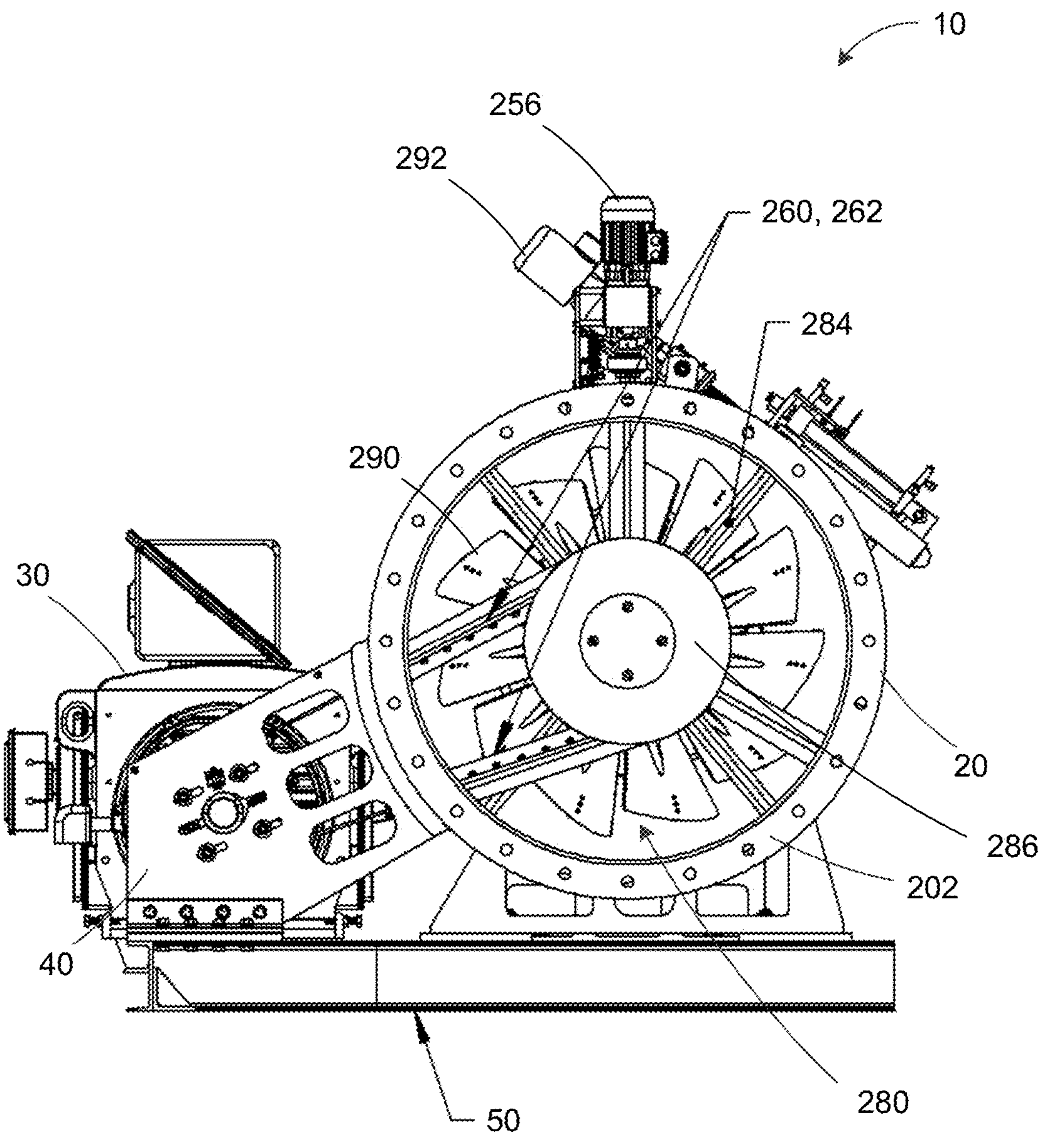
FIG. 4 is a front view of the hydropower generation system of FIG. 1.
Figure 5:
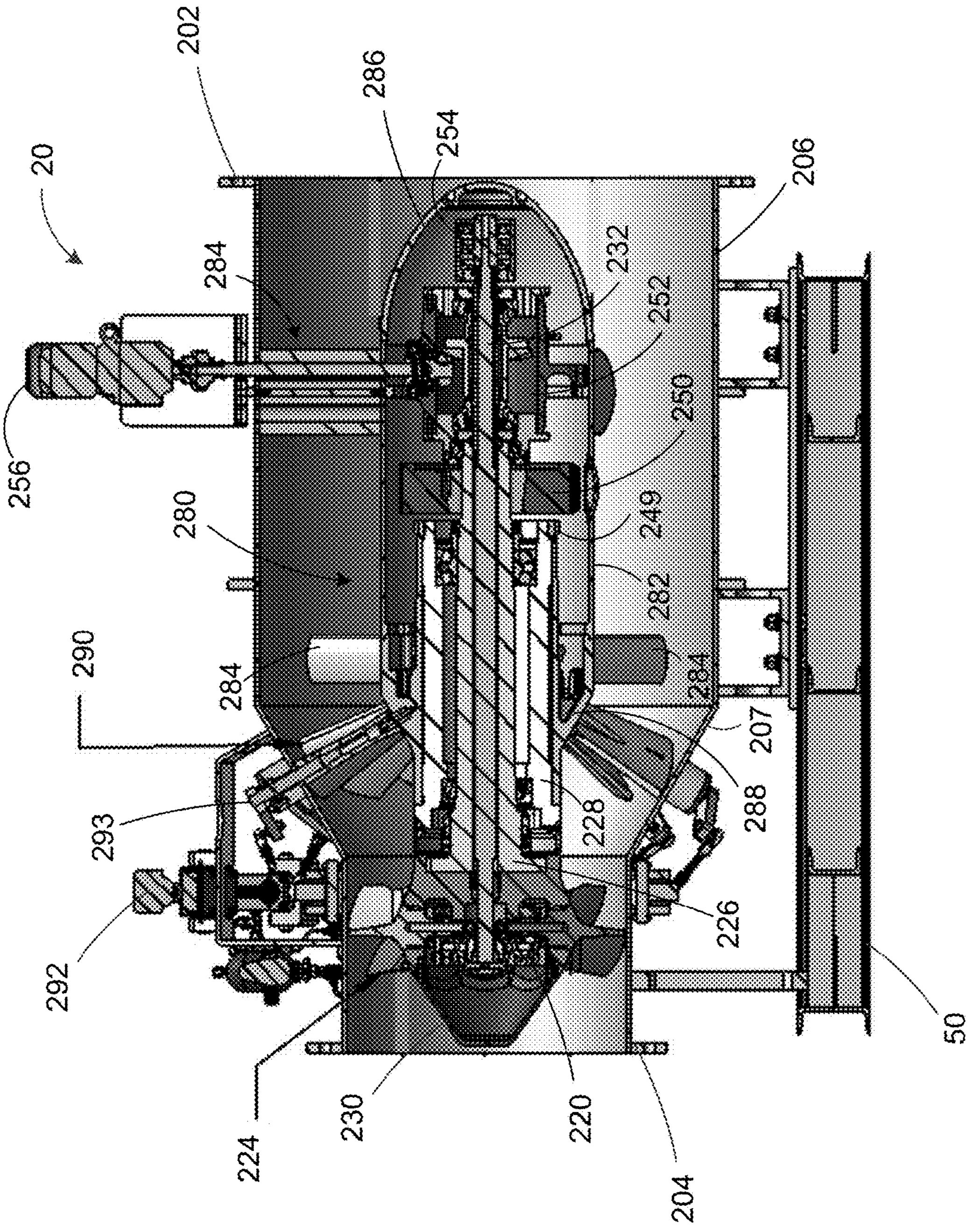
FIG. 5 is a cross-sectional view of the hydropower turbine taken along line 5-5 of FIG. 2.
Figure 6:
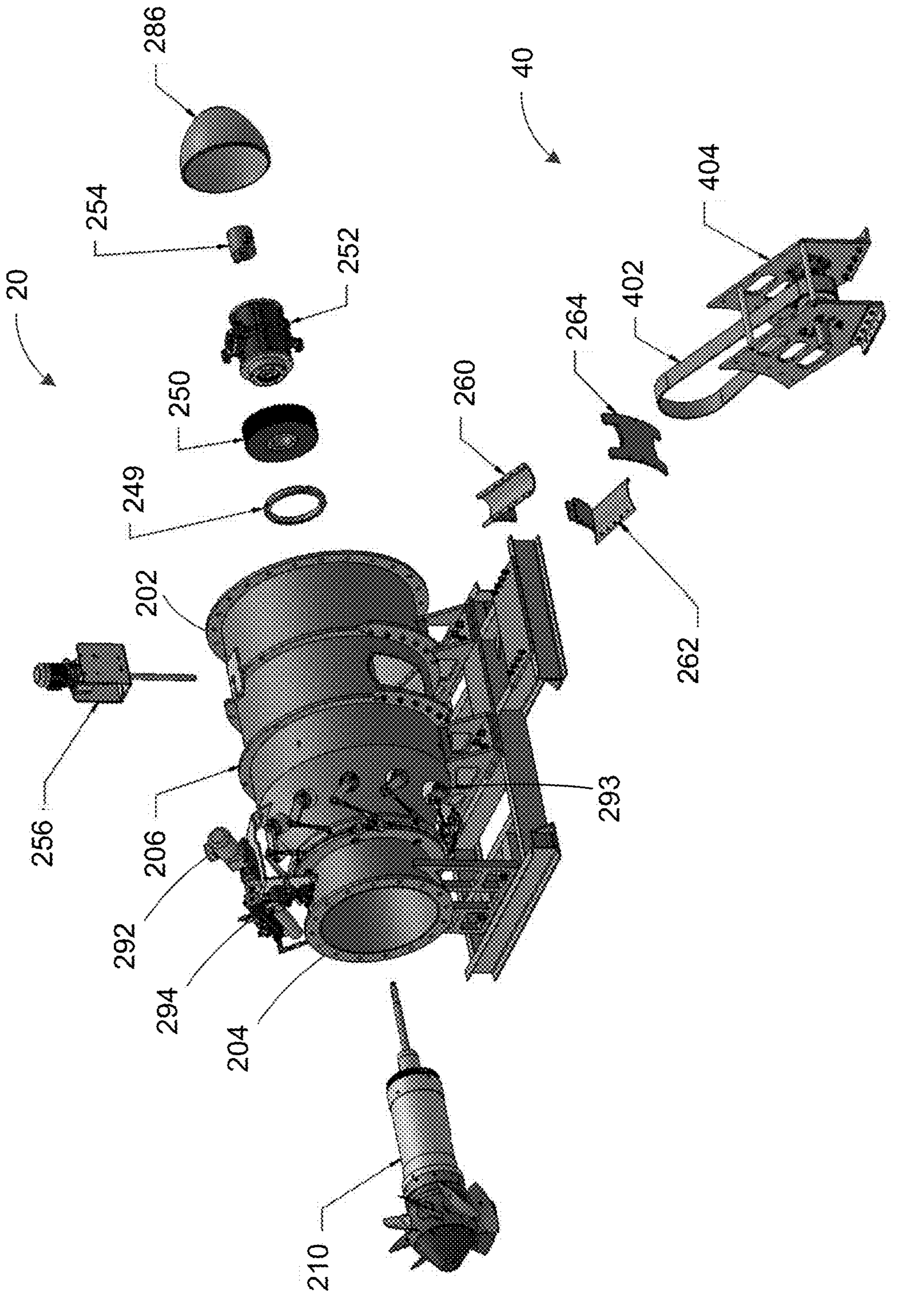
FIG. 6 is a partial exploded view of the hydropower generation system of FIG. 1.
Figure 7:
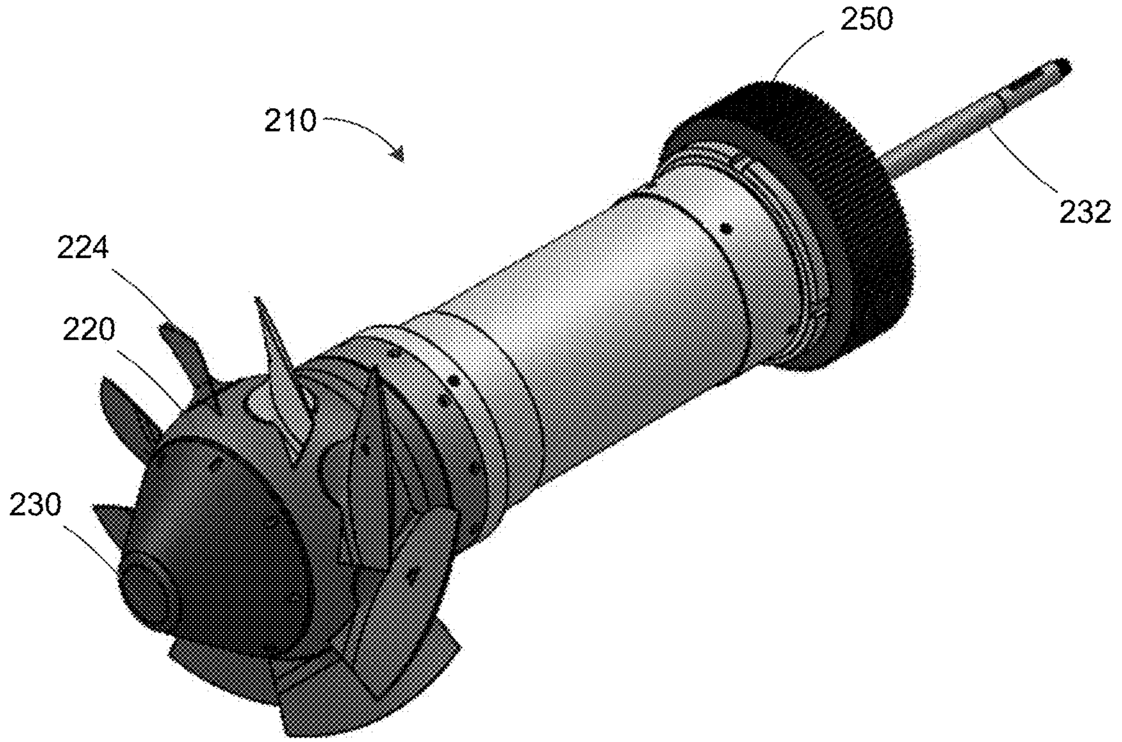
FIG. 7 is a perspective view of an embodiment of the runner assembly.
Figure 8:
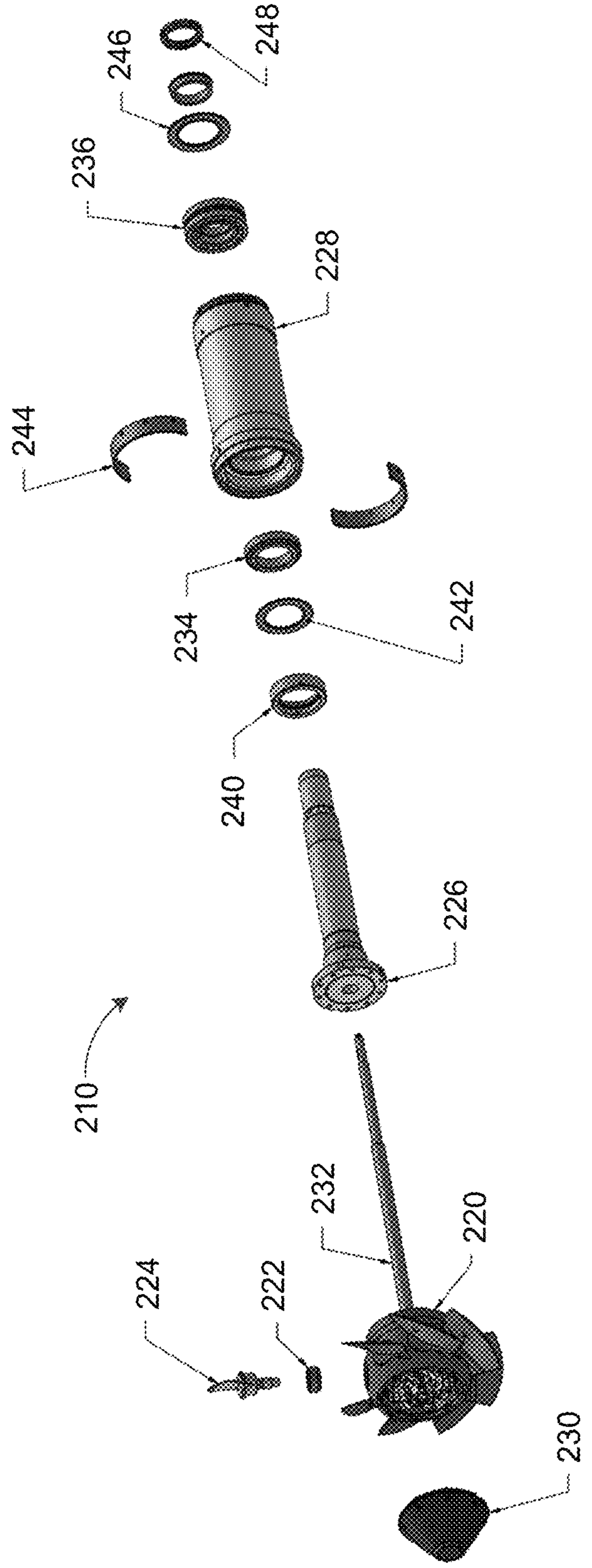
FIG. 8 is an exploded view of the runner assembly of FIG. 7.

A belt 402 of the transfer assembly 40 loops around the spindle pulley 250 and is coupled to a jackshaft and pulley assembly 404 of the transfer assembly 40. The rotation of the spindle shaft 226 and the spindle pulley 250 (as a result of water flowing over the runner blades 224) causes the belt 402 to turn or rotate the jackshaft and pulley assembly 404, which then turns or rotates a shaft of the generator 30. To permit the belt 402 to travel from the spindle pulley 250 through the housing 282 and the turbine case assembly 206 to the jackshaft and pulley assembly 404 of the transfer assembly 40, an upper belt cover 260 and a lower belt cover 262 can extend between the housing 282 and the turbine case assembly 206 to provide a sealed passageway for the belt 402 to travel. In addition to providing a passageway for the belt 402, the upper belt cover 260 and lower belt cover 262 can also provide support to the housing 282. Further, as shown in FIG. 4, the upper belt cover 260 and lower belt cover 262 are used to enclose each side (tight side or drive side and slack side or return side) of the belt 402 in its own sealed compartment. For example, the upper belt cover 260 can enclose the drive side of the belt 402 and the lower belt cover 262 can enclose the return side of the belt 402. By enclosing each side of the belt 402 in its own compartment, a more uniform flow of water around the bulb assembly 280 and through the turbine case assembly 206 is enabled before the water flow reaches the wicket gates 290. To provide access to the belt 402 and the upper and lower belt covers 260, 262, the turbine case assembly 206 can have an opening that is sealed by a belt cover access panel 264.

The wicket gates 290 can be rotationally positioned to direct the flow of the water to the runner blades 224 with a wicket control motor 292. In one embodiment, the wicket control motor 292 can be connected to a ring and one more linkages 293 such that the wicket control motor 292 is able to move all of the wickets 290 by substantially the same amount at substantially the same time. In other embodiments, more than one wicket control motor 292 can be used to control individual wickets 290. The wickets 290 can be positioned between a zero degree (0°) position where the wicket 290 is substantially perpendicular to the flow of the water and a ninety degree (90°) position where the wicket 290 is substantially parallel to the flow of the water. An emergency shutoff mechanism or brake 294 can be used to move the wickets 290 to the 0° position to substantially stop the flow of water thorough the turbine 20. The wicket control motor 292 can then be used to return the wickets 290 to a normal operating position after the emergency shutoff condition has passed. Additional information regarding the operation of the emergency shutoff mechanism 294 can be found in U.S. Pat. No. 12,012,860, which patent is hereby incorporated by reference in its entirety.

In another embodiment, a wicket servomotor can provide for the drive and adjustment of each wicket (or wicket gate) 290 via an interconnection system that includes a wicket drive linkage for each wicket 290 and a wicket ring driving the mechanical communication with wicket drive linkage and the wicket servomotor. While a mechanical drive wicket adjustment system can be used for adjusting the position of a wicket 290, other techniques and mechanisms for adjusting wicket position may also be used, such as, but not limited to, a belt drive, chain drive and hydraulic system.

Figure 9:
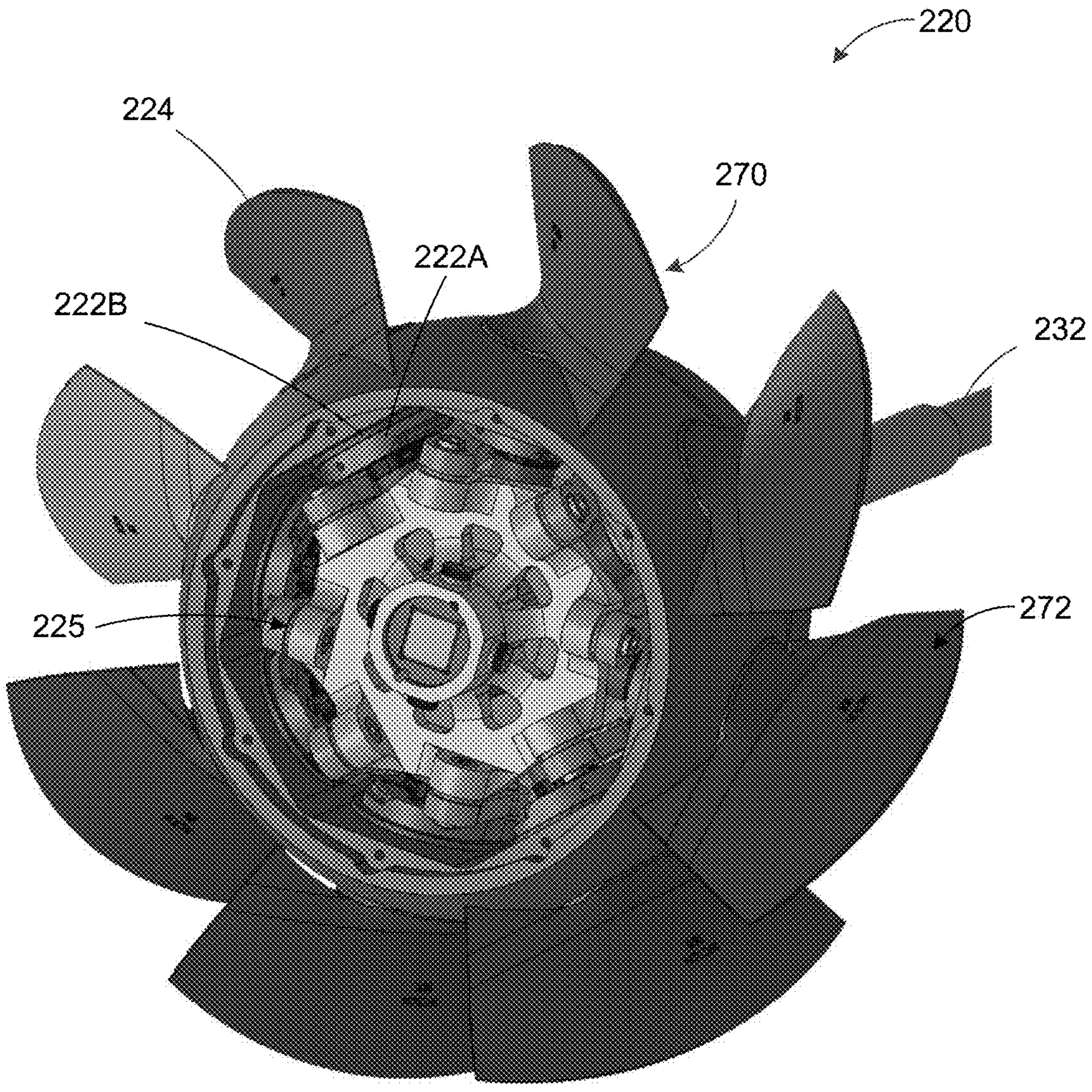
FIG. 9 is a perspective view of an embodiment of the runner hub without the nose cone.

FIG. 9 shows an embodiment of the runner hub from the runner assembly. The runner hub 220 can include 8 runner blades 224 positioned circumferentially about the runner hub 220. Each runner blade 224 can have a corresponding bearing 222A and seal 222B located in the interior of the runner hub 220. Each bearing 222A can be used to permit rotation of a corresponding runner blade 224 relative to the runner hub 220 and each seal 222B can be used to prevent water from entering the interior of the runner hub 220 at the corresponding runner blade 224. In addition, a runner adjustment mechanism or linkage 225 controlled by the control gearbox 252 via rod 232 can be used to adjust the position of the runner blade 224 on the runner hub 220. Each of the runner blades 224 can have a pressure side 270 that is in contact with the water flowing through the wickets 290 and a suction side 272 that is opposite the pressure side 270. The use of 8 runner blades 224 on the runner hub 220 enables the runner assembly 210 to rotate at a speed of at least 700 revolutions per minute (rpms) when operating at 60 Hz. In one embodiment, the runner assembly 210 can rotate at a speed of 718 rpm.

Figure 10:
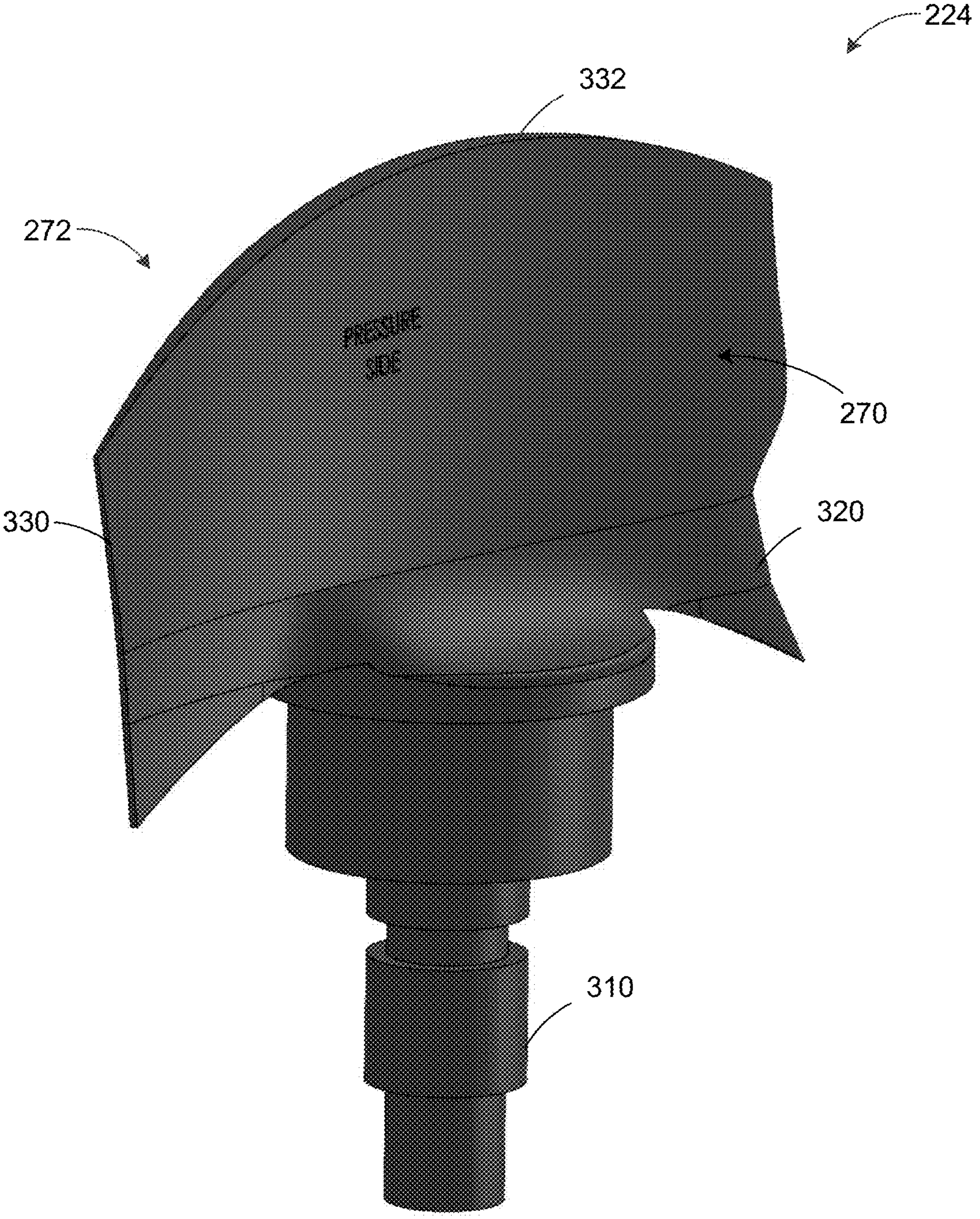
FIG. 10 is a perspective view of an embodiment of a runner blade from the runner hub.

FIG. 10 shows an embodiment of an individual runner that can be used with the runner hub. Each runner blade 224 can include a mounting portion 310, a transition portion 320 and a blade portion 330. The mounting portion 310 can be positioned inside the runner hub 220 and can include corresponding portions to enable rotation (or adjustment of the pitch) of the runner blade 224 by the runner adjustment mechanism 225. The transition portion 320 is located between the mounting portion 310 and the blade portion 330. The transition portion 320 becomes part of the blade portion 330 and provides a transition from the mounting portion 310 to the blade portion 330 and provides support to the runner blade 224. The blade portion 330 has the pressure side 270 and the suction side 272. In one embodiment, the pressure side 270 of the runner blade 224 can have a concave surface that can permit better contact with the water to turn the runner hub 220. The curvature of the concave surface maximizes lift and minimizes drag extracting pressure and kinetic energies converting it into a torque that rotates the spindle shaft 226. In one embodiment, the blade portion 330 can be defined using splined surfaces constructed with hundreds of data points that are interpolated (e.g., using NURBS (Non-Uniform Rational B-Splines)) and then modeled (e.g., using CAD modeling tools) to obtain the blade portion 330. The top of the blade portion 330 can have a curved surface 332 that can extend to the inner surface of the turbine case assembly 206 at the outlet 204 to ensure the flow of water through the turbine 20 contacts the runner blades 224 and does not bypass the runner blades 224 allowing for high efficiency. In one embodiment, the curved surface 332 can be optimized to allow for rotation of the runner blades 224 when the runner blades 224 are positioned at any angle.

Figure 11:
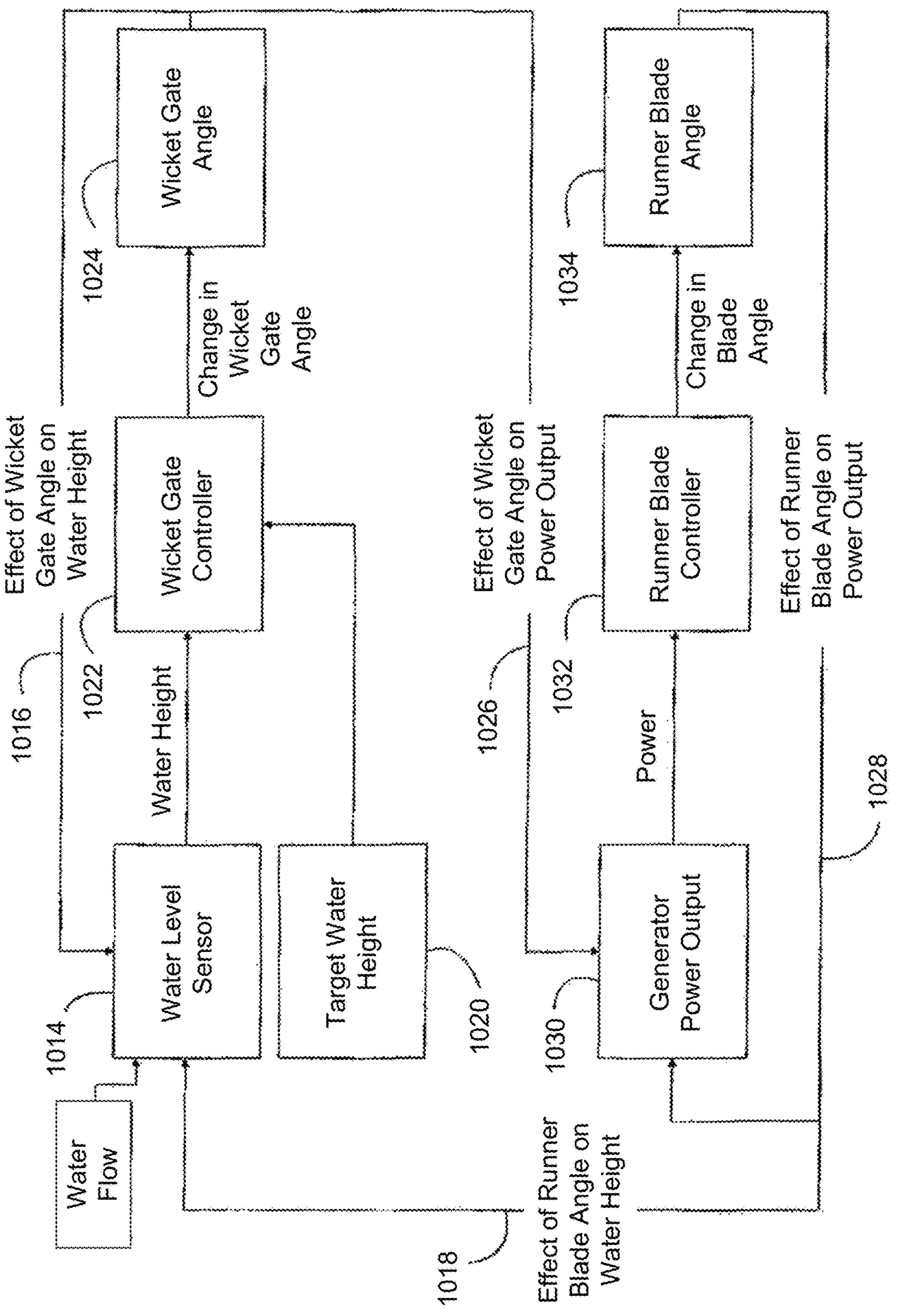
FIG. 11 is an overview flow diagram of an embodiment of a power generation control system.

FIG. 11 is an overview flow diagram of an embodiment of a power generation algorithm or control system that can be used with the hydropower generation system 10. A water level sensor 1014 obtains a reading of water height in the body of water (e.g., a reservoir). The water height can be resultant of: (i) the amount of volumetric flow in the body of water (e.g., river); and (ii) the amount of volumetric flow that is allowed through the hydropower turbine 20. The amount of volumetric flow that is allowed through the hydropower turbine 20 is the effect of wicket or wicket gate angle 1016 and runner or runner blade angle 1018 on total volumetric water flow through the turbine 20. The water height reading from the water level sensor 1014 and the target water height 1020 are then passed to the wicket gate controller 1022. The wicket gate controller 1022 then determines the appropriate adjustment (if any) in wicket gate angle 1024 to obtain the target water height 1020.

The theoretical power output of a hydropower turbine 20 can be calculated by Equation 1:

$$P=\rho*g*Q*H*e \quad (1)$$

where P is power in kilowatts, p is the water density, g is the gravitational constant, Q is the volumetric flow through the turbine 20 in cubic meters per second, H is the pressure head in meters, and e is the efficiency rating of the hydropower turbine 20. Therefore, as the position of the wicket gates (wicket gate angle 1024) and the runner blades (runner blade angle 1034) change and have an effect on the flow through the hydropower turbine 20; they also have an effect on the power output of the generator 30.

These effects are shown in FIG. 11 by the effect of wicket gate angle on power output 1026 and the effect of runner blade angle on power output 1028. A reading of the actual (not theoretical) power output from the generator 30 is passed to the runner blade controller 1032 which determines the appropriate change in runner blade angle 1034 to increase power output. The runner blade controller 1032 then sets the runner blade angle 1034 restarting the runner blade control loop. While the generator 30 has been shown and described as a means for converting torque and angular velocity to a power output, the present application is not limited in this regard as other means for converting torque and angular velocity to a power output may be used, such as, but not limited to, electrical current generating and measurement devices (measuring any one of a number of electrical current elements via an electrical current meter), mechanical power conversion and measurement devices (e.g., a dynamometer), and flow conversion and measurement devices (measuring the flow from a pump or other fluid pumping device) may be substituted without departing from the broader aspects of the present application.

Figure 12:
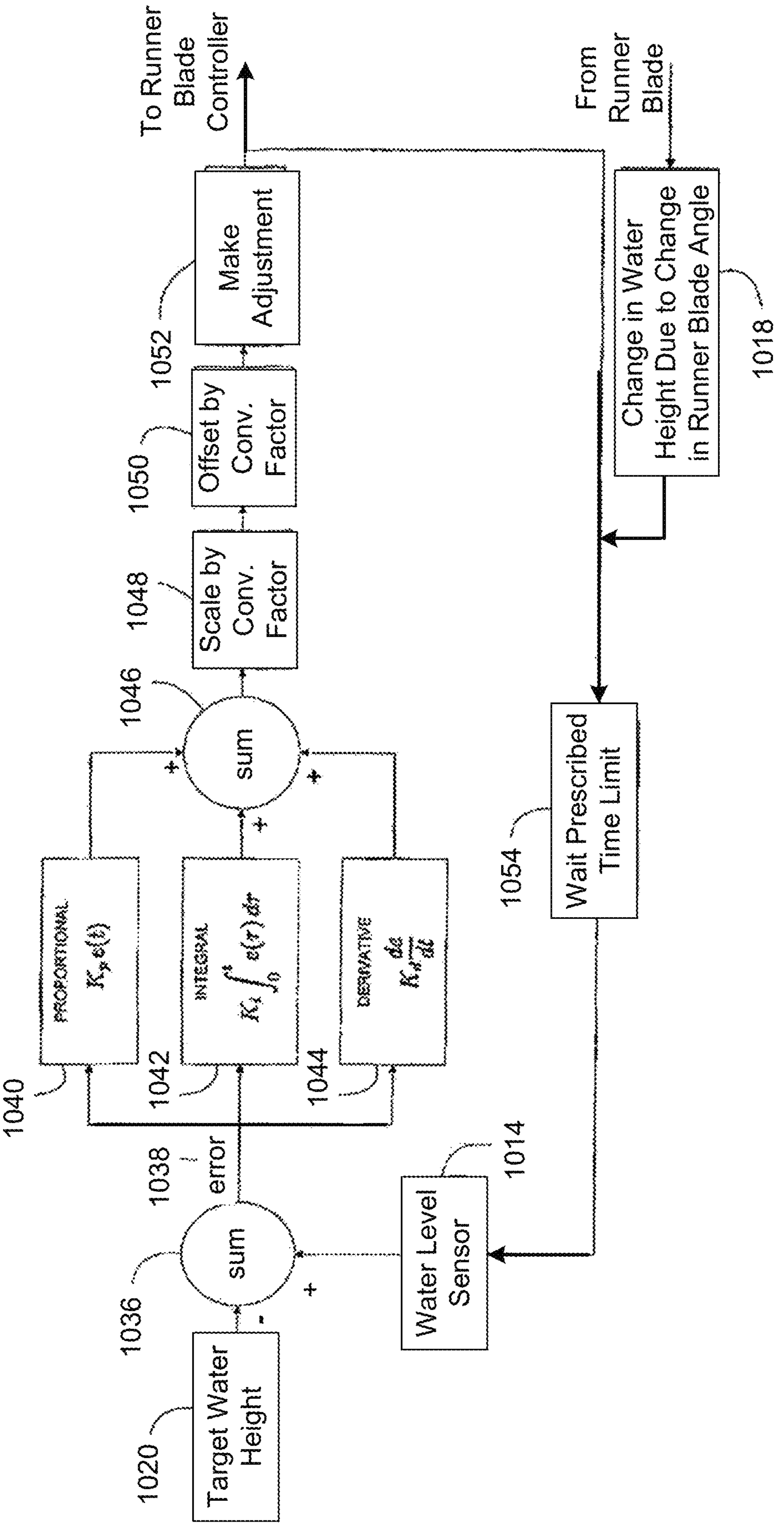
FIG. 12 is a flow diagram of an embodiment of a wicket gate control system.

FIG. 12 is a flow diagram of an embodiment of a wicket gate algorithm or control system as implemented by the wicket gate controller 1022. The wicket gate control loop represents a standard parallel Proportional-Integral-Derivative ("PID") control loop. The loop begins by taking a set point, which in this case is the actual water height (recorded from the water level sensor 1014) and subtracting the target water height 1020 in the summation block 1036 to find the system error 1038. The error 1038 is then passed to each of the three elements of the PID control. The first element, the proportional term 1040 is described by Equation 2:

$$P_{out}=K_p e(t) \tag{2}$$

where $P_{out}$ is the determined proportional change needed to correct the error 1038 in the system, $K_p$ is the proportional gain coefficient which is a scaling factor to regulate the effect of the proportional term on the system, and e(t) is the measured error as a function of time. The proportional term of the PID loop primarily accounts for the magnitude of the error in the system.

The second element of the PID control loop is the integral element 1042 which is described by Equation 3:

$$I_{out} = K_i \int_0^t e(\tau)d\tau \tag{3}$$

where $I_{out}$ is the determined change necessary to correct the error with respect to the integral of the error in the system, $K_i$ is the integral coefficient which is a scaling factor to regulate the effect of the integral term on the system, the integral term includes the integration of the error from time zero to a prescribed time limit (t). The integral element of the PID control loop accounts for the amount of time that an error exists and therefore makes an appropriate adjustment.

The final element of the PID portion of the wicket gate control is the derivative term 1044 which is best described by Equation 4:

$$D_{out} = K_d \frac{de}{dt} \tag{4}$$

where $D_{out}$ is the determined correction for the error in the system based on the derivative of the error, $K_d$ is the derivative coefficient which is a scaling factor to regulate the effect of derivative term on the system, and de/dt is the derivative of the error with respect to time. The derivative term of the PID control loop accounts for the rate at which the water height approaches the target water height to avoid overshooting or undershooting the target.

The prescribed corrections from each of the three elements of the PID control portion of the wicket gate control are then summed up 1046 to produce the total necessary correction to the system to obtain the target water height 1020. The determined correction in water height is then conditioned to apply to the wicket gate by multiplying by a scaling factor 1048 and adding an offset factor 1050 to bring the correction into an appropriate range for the wicket gate angles 1052. Basically, since water level reduces proportionally with flow and flow increases proportionally with increasing wicket gate position, an increasing wicket gate position leads to a decrease in water level, and a decreasing wicket gate position leads to an increase in water level. Thus, if the measured water level drops below the target water level, the error will be negative, which will lead to a reduction in the wicket gate angle (or position) as required. Similarly, if the measured water level is above the target water level, the error will be positive and the wicket gate angle (or position) will be increased. The adjustment in wicket gate angle 1052 is then made. As a safety precaution, the wicket gate controller 1022 then sends a signal to the runner blade controller 1032 indicating the current wicket gate position 1052. In the case that the wicket gates are closed, the runner blade controller 1032 will take no action. The wicket gate controller 1022 then allows for a prescribed time increment 1054 to pass before taking another water height reading, therefore beginning the process again.

While the wicket gate control loop 1022 has been shown and described as a standard parallel Proportional-Integral-Derivative control loop, the present application is not limited in this regard as other types of closed loop control methods that measure output, provide feedback, and make adjustments based upon such feedback, such as, but not limited to, a Proportional control loop, a Proportional-Integral control loop, a Bi-stable control loop, a Hysteretic control loop, and a Programmable Logic Control unit may be substituted without departing from the broader aspects of the present application.

Figure 13:
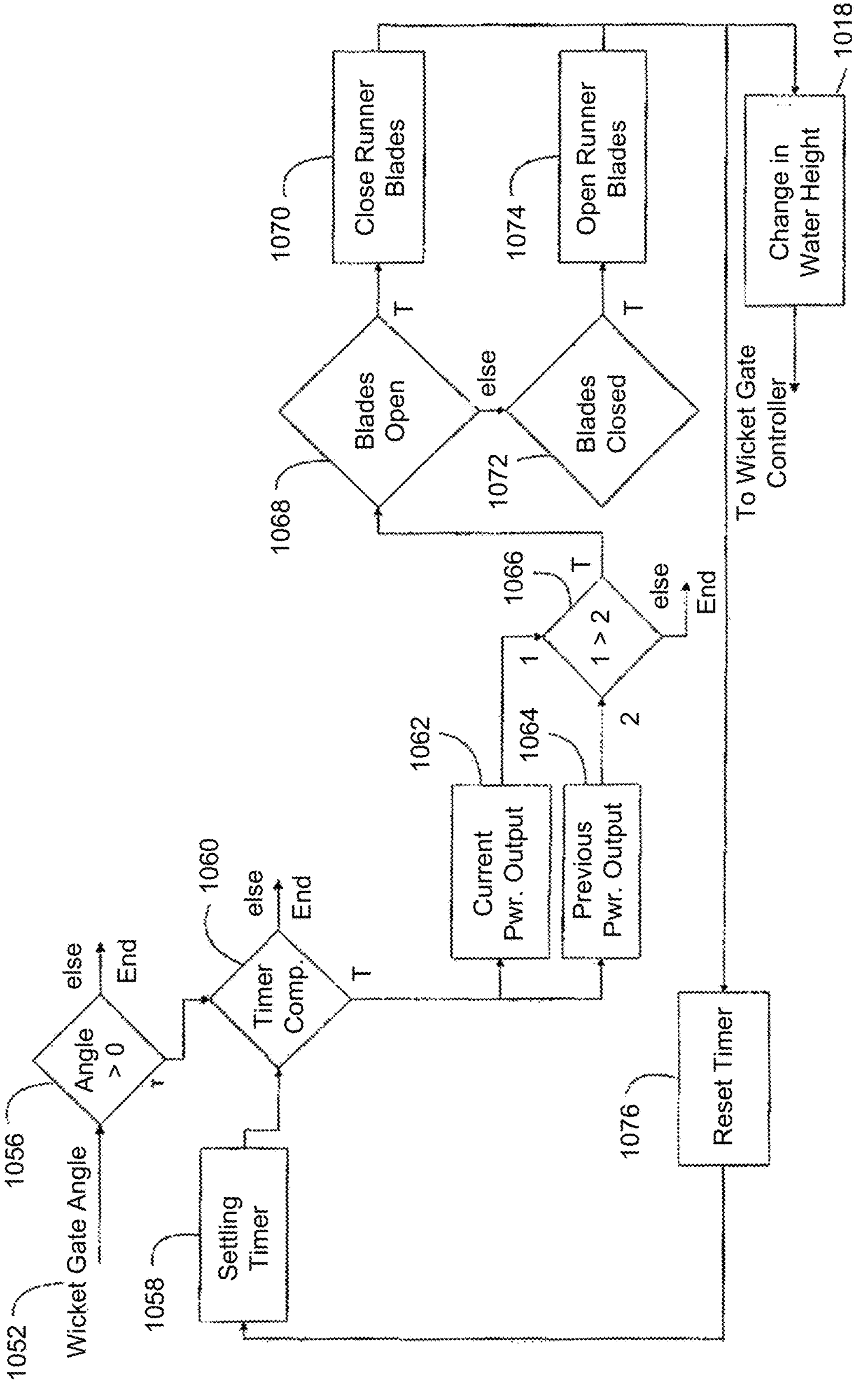
FIG. 13 is a flow diagram of an embodiment of a runner blade control system.

FIG. 13 is a flow diagram of an embodiment of a runner blade algorithm or control system. The runner blade control 1032 first takes consideration to the wicket gate angle 1052; this consideration only bears on the actions of the runner blade control 1032 in the singular condition that the wicket gates are closed. This consideration is to prevent excessive runner blade searching. If the wicket gate angle 1052 is greater than zero (not fully closed) 1056, then the runner blade control loop 1032 continues the control process. The controller then recognizes the settling timer 1058 to prevent a condition of system-chasing where the control system does not allow the physical hydropower turbine system to stabilize, causing unwanted and incorrect changes. If the condition of timer completion is met 1060 then the control loop is allowed to proceed.

The runner blade control 1032 then obtains the current power output reading from the generator 1062 and compares it with the power output of the generator obtained on the previous iteration 1064. If the current power generated is less than the power generated on the previous iteration 1066 the loop proceeds, otherwise, if the power generated has increased from the previous iteration, no change is made in the system and the loop is reinitialized. If the loop proceeds, the runner blade control 1032 then pays consideration to the action taken on the previous iteration. If the runner blades were opened a fixed increment on the previous iteration 1068 then the runner blades are closed a fixed increment on the current iteration 1070. If the runner blades were closed a fixed increment on the previous iteration 1072 then the runner blades are opened a fixed increment on the current iteration 1074. The settling timer is then reset 1076 to allow for the physical system to stabilize due to the change in water height with respect to the change in runner blade angle 1018. The runner blade control loop 1032 then begins again. Additional information regarding the operation of the power generation control system can be found in U.S. Pat. No. 8,581,430, entitled "Hydro Turbine Generator," which patent is hereby incorporated by reference in its entirety.

Figure 14:
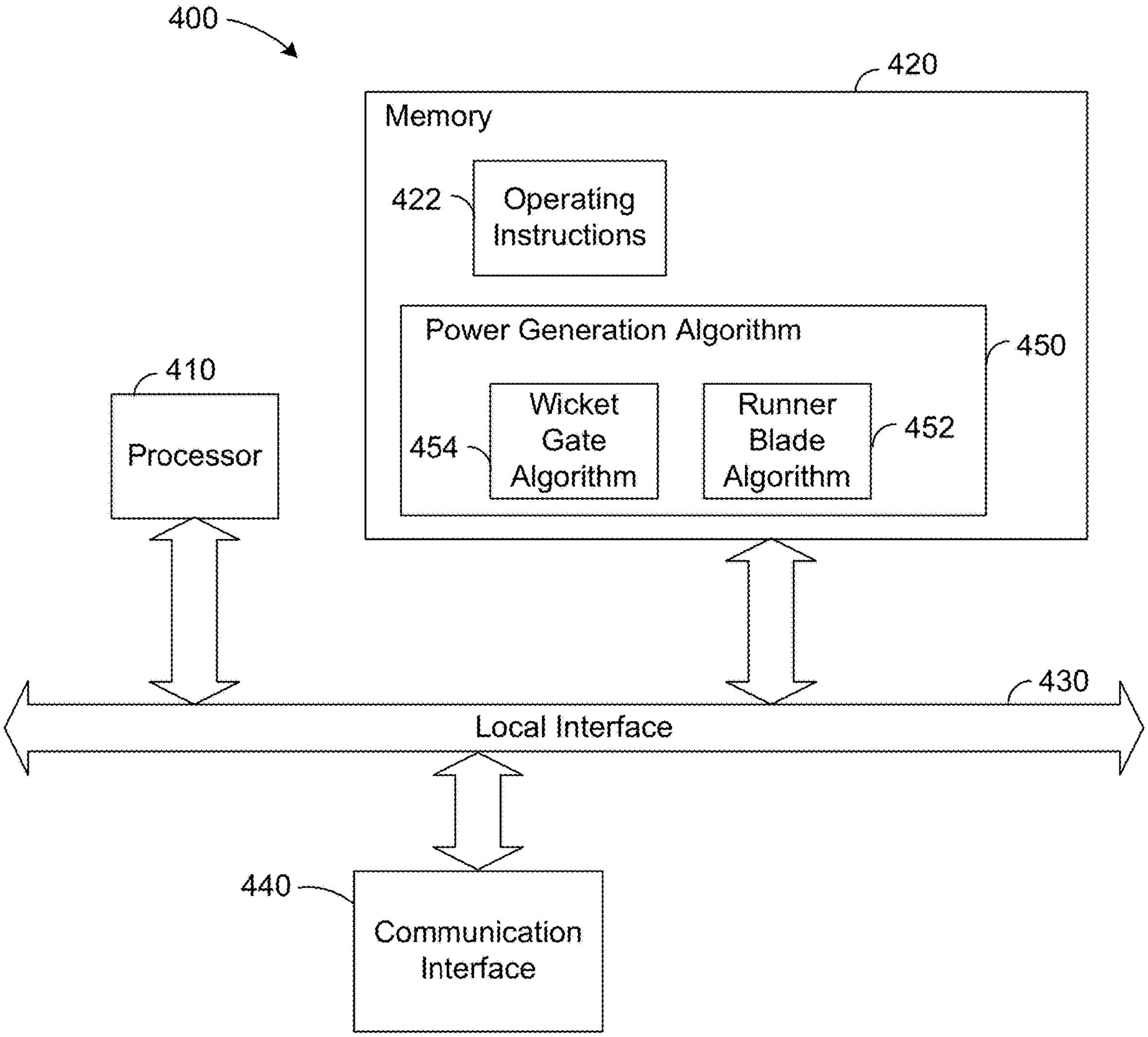
FIG. 14 is a block diagram of an embodiment of a control system for the hydropower generation system.

FIG. 14 is a block diagram of an embodiment of a control system that can be used with the hydropower generation system. The control system 400 can include one or more processors 410 to control the operations of the components of the hydropower generation system 10. As described herein, a processor 410 may include any suitable processing device such as a general-purpose processor or microprocessor executing instructions from memory, hardware implementations of processing operations (e.g., hardware implementing instructions provided by a hardware description language), any other suitable processor, or any combination thereof. In one embodiment, processor 410 may be a microprocessor that executes instructions stored in memory 420. Memory 420 includes any suitable volatile or non-volatile memory capable of storing information (e.g., instructions and data for the operation and use of the system 10), such as RAM, ROM, EEPROM, flash, magnetic storage, hard drives, any other suitable memory, or any combination thereof.

The processor 410 may be in communication with other components of the control system 400 via an internal communication interface 430. Internal communication interface 430 may include any suitable interfaces for providing signals and data between processor 410 and the other components of the control system 400. This may include communication buses such as 12C, SPI, USB, UART, GPIO and Ethernet. The control system 400 may also include a communication interface 440 to provide for wireless or wired communications with the other components of the system 10 (e.g., sensors, generator 30, runner adjustment mechanisms 225, wicket control motor 292, control gearbox 252, torque limiter 256, etc.). In one embodiment, communication interface 440 may include a wireless interface that communicates using a standardized wireless communication protocol (e.g., Wi-Fi, ZigBee, Bluetooth®, Bluetooth® low energy, Cellular, etc.) or a proprietary wireless communication protocol operating at any suitable frequency such as 900 MHz, 2.4 GHz, or 5.6 GHz.

In one embodiment, memory 420 of the control system 400 may include memory for executing instructions with processor 410, memory for storing data, and a plurality of sets of instructions to be executed by processor 410. Although memory 420 may include any suitable instructions, in one embodiment the instructions may include operating instructions 422 for generally controlling the operation of the control system 400 and a power generation algorithm 450, which can include a runner blade control algorithm 452 and a wicket gate control algorithm 454, to optimize the power output of the hydropower generation system 10.

The operating instructions 422 and/or the power generation algorithm 450 (including the runner blade control algorithm 452 and the wicket gate control algorithm 454) can be implemented in software, hardware, firmware, or any combination thereof. In the control system 400 shown by FIG. 14, the operating instructions 422 and/or the power generation algorithm 450 can be implemented in software and stored in memory 420. When the operating instructions 422 and/or the power generation algorithm 450 are implemented in software, the processor 410 may execute instructions of the operating instructions 422 and/or the power generation algorithm 450 to perform the functions ascribed herein to the corresponding components. However, other configurations of the operating instructions 422 and/or the power generation algorithm 450 are possible in other embodiments. Note that the operating instructions 422 and/or the power generation algorithm 450, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus. In addition, it is to be understood that the control system 400 can include other components not specifically identified herein.

In an embodiment, the runner blades 224 may be fabricated from a material such UNS C95300 Bronze (ASTM 415 Alum Bronze 9B) or 316 Stainless Steel (CF8M). However, in other embodiments, other materials may be used for some components of the hydropower turbine 10. For example, the nose cone 230 and inlet cover 286 may utilize composite materials and the spindle shaft 226 may be 3D metal printed. In other embodiments, the runner blades 224 can be hybrid composite/metal construction.

Another embodiment of a hydropower generation system 10 can include a self-contained unit incorporating fully integrated systems including all of the turbine components, the wicket and runner actuators, the generator or other power adapting device, the speed reduction drive, and all other system components provided on one integrated and easily mounted containment.

As stated hereinabove, a hydropower generation system 10 includes an integrated self-contained computer based control system or module. A power generation system may incorporate a plurality of hydropower generation system 10, wherein each system 10 respectively includes an integrated self-contained computer based control module. In power generation systems having multiple hydropower generation systems 10, each system 10 is brought online in series: System No. 1 is brought online; when System No. 1 reaches its maximum operating rating, System No. 2 is brought online; and when System No. n reaches its maximum operating rating, System No. n+1 is brought online. A power generation system having a plurality of hydropower generation systems 10, wherein each system 10 respectively has an integrated self-contained computer based control module, and each integrated self-contained computer based control module is in communication with one or more other modules, provides for the following: i) daisy-chain connection and communication between multiple systems 10; ii) cycling multiple systems 10 online and offline based on available flow; iii) detection of "out of service" systems 10 and subsequent automatic compensation for available flows and optimized power generation via the remaining systems 10; iv) monitoring of individual system 10 performance including detection of "out of limits" performance and subsequent adjustment to remaining systems; and v) distribution of wear based on total operational time and performance of each individual system 10, with automatic adjustment to sequencing of all systems 10 to distribute operational time and subsequent wear and tear.

In one embodiment, no hydraulic systems are required. Instead, all actuations, including actuators that control runner blade angle and wicket gate angle, are achieved through servomotors and mechanical devices. The variable wicket gate blade angles and the rotating running blade angles are independent of one another allowing the wicket gate blades to pre-condition flow to runner blades adjusted for maximum power production.

In an embodiment, the turbine 20 can include a wicket gate arrangement with an independent relationship to the rotating runner blades. The independence of the wicket gates to the runner blades allows for pre-conditioning of the flow of water prior to the water's contact with the runner blades. The wicket gates can be set for various runner blade angles as determined by the control system. The control system provides for the independent control of the wicket gates such that the angle of the wicket gates is adjusted to maintain reservoir level and to pre-condition the flow of water thus allowing the runner blades to independently achieve optimal power output as determined by the control system.

In another embodiment, the turbine 20 can include a means for converting torque and angular velocity to a power output such as torque converter to precisely control a variable speed propeller and a variable speed generator. Accordingly, the runner assembly 210 can be managed to operate at the most efficient speed for any given operating conditions thereby generating optimum torque while permitting the power generated to be fed back into the power grid (typically, 50-60 Hz). The control system employs a series of controllers and sensors to measure operating conditions and automatically fine-tune the overall system through a number of feedback loops. Some operating parameters controlled by the control system include: inlet volume and direction; variable wicket gate angles; variable runner blade pitch; target elevation of the source of flow; the system flow rates; and other standard hydropower generator controls.

Although the figures herein may show a specific order of method steps, the order of the steps may differ from what is depicted. Also, two or more steps may be performed concurrently or with partial concurrence. Variations in step performance can depend on the components chosen and on designer choice. All such variations are within the scope of the application.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A hydropower turbine comprising:

a turbine case assembly having an inlet to receive water and outlet to discharge water, wherein the inlet has a larger diameter than the outlet;

a runner assembly positioned inside the turbine case assembly and extending between the inlet and the outlet, the runner assembly comprising:

a runner hub positioned near the outlet;

a plurality of adjustable runner blades mounted on the runner hub, wherein the plurality of adjustable runner blades comprises 8 runner blades; and a spindle shaft extending from the runner hub;

a bulb assembly connected to the runner assembly, the bulb assembly comprising:

a housing configured to enclose at least a portion of the spindle shaft; and a pulley mounted on the spindle shaft and configured to receive a belt configured to couple the turbine to a generator;

a plurality of adjustable wicket gates positioned inside the turbine case assembly and configured to direct water flow to the plurality of runner blades; and wherein the 8 runner blades of the runner assembly are configured to rotate at a speed of at least 700 revolutions per minute upon water flowing over the 8 runner blades from a head of between 45 and 110 feet.

2. The turbine of claim 1, wherein each runner blade of the plurality of adjustable runner blades includes:

a mounting portion positioned inside the runner hub;

a transition portion extending from the mounting portion; and a blade portion extending from the transition portion, the blade portion having a pressure side and a suction side opposite the pressure side, wherein the pressure side of the blade portion has a concave surface configured to permit contact with the water to turn the runner hub.

3. The turbine of claim 2, wherein the blade portion is defined using a plurality of splined surfaces.

4. The turbine of claim 2, wherein a top of the blade portion has a curved surface extending to an inner surface of the turbine case assembly.

5. The turbine of claim 1, further comprises an upper belt cover and a lower belt cover, each extending between the housing and the turbine case assembly, the upper belt cover and the lower belt cover each configured to provide a sealed passageway for one of a tight side or a slack side of the belt.

6. The turbine of claim 1, further comprises a control system to adjust the pitch of the plurality of adjustable runner blades, wherein the control system is configured to command a servomotor to rotate a pitch adjustment shaft engaging a runner control gearbox to change the pitch of the plurality of adjustable runner blades.

7. The turbine of claim 1, wherein the housing is mounted in the turbine case assembly using one or more supports.

8. The turbine of claim 1, wherein the plurality of adjustable wicket gates are positionable between a zero degree (0°) position and a ninety degree (90°) position.

9. The turbine of claim 1, wherein the runner hub includes a nose cone extending towards the outlet and the housing includes an inlet cover extending towards the inlet, wherein the nose cone and the inlet cover is one of a composite material or a metal.

10. The turbine of claim 1, wherein the plurality of adjustable runner blades are one of a hybrid composite/metal construction or a metal construction.

11. A hydropower generation system comprising:

a hydropower turbine, the hydropower turbine comprising:

a turbine case assembly having an inlet to receive water and outlet to discharge water, wherein the inlet has a larger diameter than the outlet;

a runner assembly positioned inside the turbine case assembly and extending between the inlet and the outlet, the runner assembly comprising:

a runner hub positioned near the outlet;

a plurality of adjustable runner blades mounted on the runner hub, wherein the plurality of adjustable runner blades comprises 8 runner blades; and a spindle shaft extending from the runner hub;

a bulb assembly connected to the turbine case assembly with at least one support, the bulb assembly comprising:

a housing configured to enclose at least a portion of the spindle shaft; and a pulley mounted on the spindle shaft; and a plurality of adjustable wicket gates positioned inside the turbine case assembly and configured to direct water flow to the plurality of runner blades;

a generator; and a transfer assembly configured to transfer torque from the hydropower turbine to the generator, the transfer assembly comprising a belt drive having a belt coupled to the pulley on the spindle shaft; and wherein the 8 runner blades of the runner assembly are configured to rotate at a speed of at least 700 revolutions per minute upon about 60 cfs of water flowing over the 8 runner blades from a head of between 45 and 110 feet and the generator is configured to output a power of about 500 kilowatts when the runner assembly is rotated at the speed of at least 700 revolutions per minute.

12. The system of claim 11, wherein each runner blade of the plurality of adjustable runner blades includes:

a mounting portion positioned inside the runner hub;

a transition portion extending from the mounting portion; and a blade portion extending from the transition portion, the blade portion having a pressure side and a suction side opposite the pressure side, wherein the pressure side of the blade portion has a concave surface configured to permit contact with the water to turn the runner hub.

13. The system of claim 12, wherein the blade portion is defined using a plurality of splined surfaces.

14. The system of claim 12, wherein a top of the blade portion has a curved surface extending to an inner surface of the turbine case assembly.

15. The system of claim 11, further comprises an upper belt cover and a lower belt cover, each extending between the housing and the turbine case assembly, the upper belt cover and the lower belt cover each configured to provide a sealed passageway for one of a tight side or a slack side of the belt.

16. The system of claim 11, further comprises a control system to adjust the pitch of the plurality of adjustable runner blades, wherein the control system is configured to command a servomotor to rotate a pitch adjustment shaft engaging a runner control gearbox to change the pitch of the plurality of runner blades.

17. The system of claim 11, wherein the at least one support extends from the housing to an interior surface of the turbine case assembly.

18. The system of claim 11, wherein the plurality of adjustable wicket gates are positionable between a zero degree (0°) position and a ninety degree (90°) position.

19. The system of claim 11, wherein the runner hub includes a nose cone extending towards the outlet and the housing includes an inlet cover extending towards the inlet, wherein the nose cone and the inlet cover is one of a composite material or a metal.

20. The system of claim 11, wherein the plurality of adjustable runner blades are one of a hybrid composite/metal construction or a metal construction.

* * * * *